US010938102B2

(12) United States Patent
Abuasabeh et al.

(10) Patent No.: US 10,938,102 B2
(45) Date of Patent: Mar. 2, 2021

(54) SEARCH TRACK ACQUIRE REACT SYSTEM (STARS) DRONE INTEGRATED ACQUISITION TRACKER (DIAT)

(71) Applicant: The United States of America, as represented by the Secretary of the Navy, Crane, IN (US)

(72) Inventors: Jawad Abuasabeh, Fishers, IN (US); Todd B. Welch, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/111,204

(22) Filed: Aug. 23, 2018

(65) Prior Publication Data

US 2019/0067812 A1 Feb. 28, 2019

Related U.S. Application Data

(60) Provisional application No. 62/549,235, filed on Aug. 23, 2017.

(51) Int. Cl.
*H01Q 3/08* (2006.01)
*B64C 39/02* (2006.01)
(Continued)

(52) U.S. Cl.
CPC ............. *H01Q 3/08* (2013.01); *B64C 39/024* (2013.01); *G06F 3/04812* (2013.01); *G11B 20/10527* (2013.01); *H01Q 21/293* (2013.01); *H04W 4/026* (2013.01); *H04W 4/027* (2013.01); *H04W 4/029* (2018.02); *B64C 2201/127* (2013.01);
(Continued)

(58) Field of Classification Search
CPC .......... H01Q 3/08; H01Q 21/293; H01Q 1/28; H04W 4/029; H04W 4/026; H04W 4/027; B64C 39/024; B64C 2201/127; G06F 3/04812; H04L 67/12; G11B 20/10527; G11B 2020/10537
See application file for complete search history.

(56) References Cited

U.S. PATENT DOCUMENTS 9,412,278 B1 * 8/2016 Gong ..................... G06F 16/29
9,529,360 B1 * 12/2016 Melamed ................. H04K 3/92
(Continued)

*Primary Examiner* — Rufus C Point
(74) *Attorney, Agent, or Firm* — Naval Surface Warfare Center, Crane Division; Christopher A. Monsey

(57) ABSTRACT

Exemplary drone detection, tracking, and control systems as well as related methods are provided. An exemplary system can include directional antennas and a movement system that moves the directional antennas in various azimuth and elevation orientations. A control system includes a video signal processor, a transceiver, an input/output system, a user interface, a wireless system, a machine instruction storage medium, and a plurality of machine readable instructions that operate the antenna assembly to detect, orient on, and record at least a video signal from a moveable platform as well as generate a graphical user interface (GUI) that shows a map with a user location, the antenna system location, and orientation of the antenna assembly with line of bearing. The GUI also displaying a plurality of radio channel and detected signal information. A display is provided that displays the GUI and enables user interaction with the GUI and system.

5 Claims, 7 Drawing Sheets

(51) Int. Cl.
*H04W 4/029* (2018.01)
*H04W 4/02* (2018.01)
*G06F 3/0481* (2013.01)
*G11B 20/10* (2006.01)
*H01Q 21/29* (2006.01)
*H01Q 1/28* (2006.01)
*H04L 29/08* (2006.01)

(52) U.S. Cl.
CPC ...... *G11B 2020/10537* (2013.01); *H01Q 1/28* (2013.01); *H04L 67/12* (2013.01)

(56) References Cited

U.S. PATENT DOCUMENTS

| | | | | |
|---|---|---|---|---|
| 9,669,926 B2* | 6/2017 | Levien | ................ | G08G 5/0013 |
| 9,767,699 B1* | 9/2017 | Borghese | ............. | G08G 5/0026 |
| 9,862,489 B1* | 1/2018 | Weinstein | ................ | B64F 1/02 |
| 10,040,554 B1* | 8/2018 | Weinstein | ................ | B64F 1/02 |
| 10,118,692 B1* | 11/2018 | Beckman | ............. | G08G 5/0034 |
| 2015/0302858 A1* | 10/2015 | Hearing | ................... | G01H 1/00 |
| | | | | 381/58 |
| 2016/0105233 A1* | 4/2016 | Jalali | ........................ | H01Q 3/08 |
| | | | | 342/359 |
| 2016/0189549 A1* | 6/2016 | Marcus | ................ | G08G 5/0039 |
| | | | | 701/3 |
| 2016/0288905 A1* | 10/2016 | Gong | ..................... | G06F 21/31 |
| 2017/0069214 A1* | 3/2017 | Dupray | ................ | G08G 5/0013 |
| 2017/0148467 A1* | 5/2017 | Franklin | ............... | G10L 25/39 |
| 2017/0192089 A1* | 7/2017 | Parker | ................ | F41H 13/0075 |
| 2018/0025649 A1* | 1/2018 | Contreras | ............... | G01C 21/00 |
| | | | | 701/3 |
| 2018/0046179 A1* | 2/2018 | Choi | ........................ | G06F 3/017 |
| 2018/0081355 A1* | 3/2018 | Magy | ..................... | H04L 67/12 |
| 2018/0157255 A1* | 6/2018 | Halverson | ............ | B64C 39/024 |
| 2019/0025858 A1* | 1/2019 | Bar-Nahum | ........... | B64D 47/08 |
| 2019/0108472 A1* | 4/2019 | Sweeney | ................ | B64C 39/024 |
| 2019/0310628 A1* | 10/2019 | Taveira | ................ | G08G 5/0086 |

* cited by examiner

| EXEMPLARY UPLINK, TELEMETRY AND PAYLOAD (E.G. VIDEO) DATA LINK CHANNELS OR FREQUENCIES | ~900 MHZ (E.G., 902-928) |
|---|---|
| | ~1.2 GHZ (E.G., 1.24 TO 1.36) |
| | ~2.4 GHZ (E.G., 2.3 TO 2.5) |
| | ~5.8 GHZ (E.G., 5.68 TO 5.94) |
| | MAY OR MAY NOT USE SPREAD SPECTRUM FOR TRANSMIT OR RECEIVE CHANNEL SELECTIONS |

| 71 | PUBLIC VOID LOOP() | CONTINUOUS LOOP THAT HANDLES ALL PROCESSING AND EVENTS. LOOP IS CONTROLLED BY A BOOLEAN FLAG INDICATING IF THE SYSTEM IS SCANNING (360 DEGREE COVERAGE MEASURING RSSI FOR ALL CHANNELS) OR TRACKING (DETERMINING LINE OF BEARING FOR CHANNEL OF INTEREST) |
|---|---|---|
| 73 | PUBLIC VOID SetChannelModule(INT CHANNEL) | SETS THE CURRENT CHANNEL ON THE RECEIVERS TO THE SPECIFIED CHANNEL |
| 75 | PUBLIC VOID ReadRSSI() | READS AND AVERAGES RSSI FROM ALL RECEIVERS |
| 77 | PUBLIC BOOLEAN PassThreshold_PAN_LEFT() | DETERMINE IF THE SYSTEM SHOULD PAN TO THE LEFT |
| 79 | PUBLIC BOOLEAN PassThreshold_PAN_RIGHT() | DETERMINE IF THE SYSTEM SHOULD PAN TO THE RIGHT |
| 81 | PUBLIC BOOLEAN PassThreshold_TILT_UP() | DETERMINE IF THE SYSTEM SHOULD TILT UP |
| 83 | PUBLIC BOOLEAN PassThreshold_TILT_DOWN() | DETERMINE IF THE SYSTEM SHOULD TILT DOWN |
| 85 | DOUBLE PWMtoAZ() | DETERMINE THE CURRENT AZIMUTH OF THE SYSTEM |
| 87 | DOUBLE PWMtoEL() | DETERMINE THE CURRENT ELEVATION OF THE SYSTEM |
| 89 | PRIVATE VOID UpdateTextTrack() | UPDATE THE USER INTERFACE WITH NEW RSSI VALUE OF CHANNEL THAT IS BEING TRACKED |
| 91 | PRIVATE VOID UpdateListView() | UPDATE THE LIST OF CHANNELS ON THE USER INTERFACE WITH NEW RSSI VALUES SORTED IN DESCENDING ORDER |
| 93 | PUBLIC VOID UpdateMapMarkerRotation(FLOAT ANGLE) | UPDATE THE MAP ON THE USER INTERFACE WITH THE NEW LINE OF BEARING OF THE SYSTEM |

*FIG. 8*

EXEMPLARY APPLICATION CYCLE:

SCAN

STEP 101: SCAN: ALL CHANNELS USING CENTER ANTENNA
    STEP 103: CALCULATE: RELATIVE RECEIVED SIGNAL STRENGTH (RSSI) OF EACH CHANNEL
    STEP 105: UPDATE POSITION: ROTATE 45 DEGREES
    STEP 107: UPDATE GUI: DISPLAY RSSI OF ALL CHANNELS IN DESCENDING ORDER AND UPDATE LINE OF BEARING;
    (BACK TO STEP 101) OR USER SELECTS CHANNEL TO TRACK (PROCEED TO STEP 109)

TRACK

STEP 109: SCAN: SELECTED CHANNEL WITH FOUR OUTER ANTENNAS
    STEP 111: CALCULATE: RSSI OF THE SELECTED CHANNEL FROM EACH ANTENNA AND DETERMINE WHICH OUTER
    ANTENNA HAD THE STRONGEST RSSI
    STEP 113: UPDATE POSITION: AZIMUTH (PAN) OR ELEVATION (TILT) IN DIRECTION OF ANTENNA WITH STRONGEST
    RSSI
    STEP 115: UPDATE GUI: UPDATE RSSI AND LINE OF BEARING;
    (BACK TO STEP 107) OR USER SELECTS SCAN BUTTON (BACK TO STEP 101)

*FIG. 9*

EXEMPLARY SEQUENCE OF FUNCTION CALL EXECUTIONS

SEARCH TRACK ACQUIRE REACT SYSTEM (STARS) DRONE INTEGRATED ACQUISITION TRACKER (DIAT)

CROSS-REFERENCE TO RELATED APPLICATIONS

The present U.S. Non-Provisional Patent application claim priority to the U.S. Provisional Patent Application Ser. No. 62/549,235, filed Aug. 23, 2017, entitled "DRONE INTEGRATED ACQUISITION TRACKER (DIAT)," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,504 and 200,457) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and methods for providing capabilities to detect and responds to unauthorized or undesirable drone with various sensors such as a video camera. More particularly, embodiments of the invention are directed to providing a capability which can be used to detect various drone systems with a relatively lower cost system that can quickly detect unauthorized drones. Some additional embodiments provide a capability to avoid erroneous detections from systems that use the same or similar detectable systems. Embodiments of the invention further provide a capability to scan, track, and acquire line of bearing of inbound drones at a very large distance using various approaches including a passive detection system.

Generally, common drone video signals are sent over known/unencrypted channels that can be transmitted and received up to 40 kilometers. Signal transmission and receipt is all accomplished by using low cost, readily available Commercial off the Shelf (COTS) hardware. Due to the ease of use, these video systems are used by entities for various undesirable purposes or even illegal activities such as criminal activities, fire correction, surveillance and propaganda recordings.

Multiple urgent requirements are emerging for a Counter-Unmanned Ariel Systems (C-UAS) capability. The number of incidents of Radio Controlled Model Aircrafts (RCMA) being used by the adversary or unauthorized persons is increasing rapidly. This need will continue to grow as commercial RCMA technology becomes more advanced, cheaper and readily available. An increasing use of RCMAs/ small UAS's used by the adversary for adverse use, both overseas and domestically. Previous and existing methods to detect UAS's include RADAR systems and acoustic signatures. Both have been show to provide less than satisfactory results. Detection based on signals that are being transmitted from a particular drone can dramatically increase a probability of detection resulting in a more reliable system.

Referring to FIG. 1, an exemplary example of an adversary or unauthorized drone operator 1 is shown operating a control system that sends/receives command and control (C2) signals and a video signal 5 from an unauthorized drone with video capability 3. In this example, the unauthorized drone 3 further transmits a video downlink 7 to another unauthorized entity or entities 9 who may take undesirable or unauthorized actions. The unauthorized drone 3 can be taking video images of an area under surveillance 11 which are sent in the C2/video 5 and video downlink 7 feed. Persons or entities who wish to be informed of the unauthorized drone 3 presence and collection/transmission of the video downlink 7 of the area under surveillance 11 need capabilities to scan, track, intercept video feed, acquire line of bearing, "slew to cue" for identification and defeat which are optimized for detecting various classes of drones such as commercial RCMA UAS systems that greatly increase an entity's ability to rapidly and more easily detect commercial unmanned drone systems. Additional embodiments can also provide a slew to cue for other systems which are receiving outputs of an embodiment of this system. Additional embodiments can further intercept and provide a display video feed of the unauthorized drone's 3 video downlink 7 locally or sending it remotely.

An exemplary embodiment of the invention generally includes various components and systems including a directional antenna array with multiple elements (receives transmitted signals); a custom circuit board (providing an interface for various critical components and interfaces); a voltage regulator (e.g., takes a 12 volt input and outputs 5 volts; powers system); video receiver modules (capturing video signal); an input/output (IO) board with, e.g., Bluetooth® systems (interpret control signals); a digital video recording (DVR) module (record/playback of video signal(s)); a USB Serial Interface (outputs data for use in other connected systems); a mobile device (a main processing device and graphic user interface (GUI); communicates with IO board); a main assembly (houses or supports custom circuit board, mobile device and antenna array); a motorized positioning system (moves or positions main assembly); a battery (supplies power to system).

Various embodiments provide a passive system with various capabilities to detect, locate and track a drone. This system could be integrated with existing vehicle mounted and fixed site force protection systems and provide UAS cued track data for identification and defeat.

Various embodiments can also include systems which are able to distinguish between RCMA UAS systems which use the same or similar systems that are detectable such as communication systems using the same or similar frequencies and data signals. For example, exemplary systems can use Doppler changes in received signals indicating that a source is moving which can disqualify stationary signal emission systems. Another embodiment can use flight, position (azimuth/elevation, altitude, etc), or movement profiles to screen out systems such as fixed location Wi-Fi systems that happen to use the same signal frequency that a RCMA UAS is using. Another embodiment can also detect contents of a transmitted signal to determine if the signal is or is not a video signal and therefore screen out non-sensor or video signals to further reduce false detections.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures.

FIG. 8 shows an exemplary list of software functions that are executed to perform various functions associated with at least one embodiment of the invention;

FIG. 9 shows an exemplary application system with scan and track functions associated with at least one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
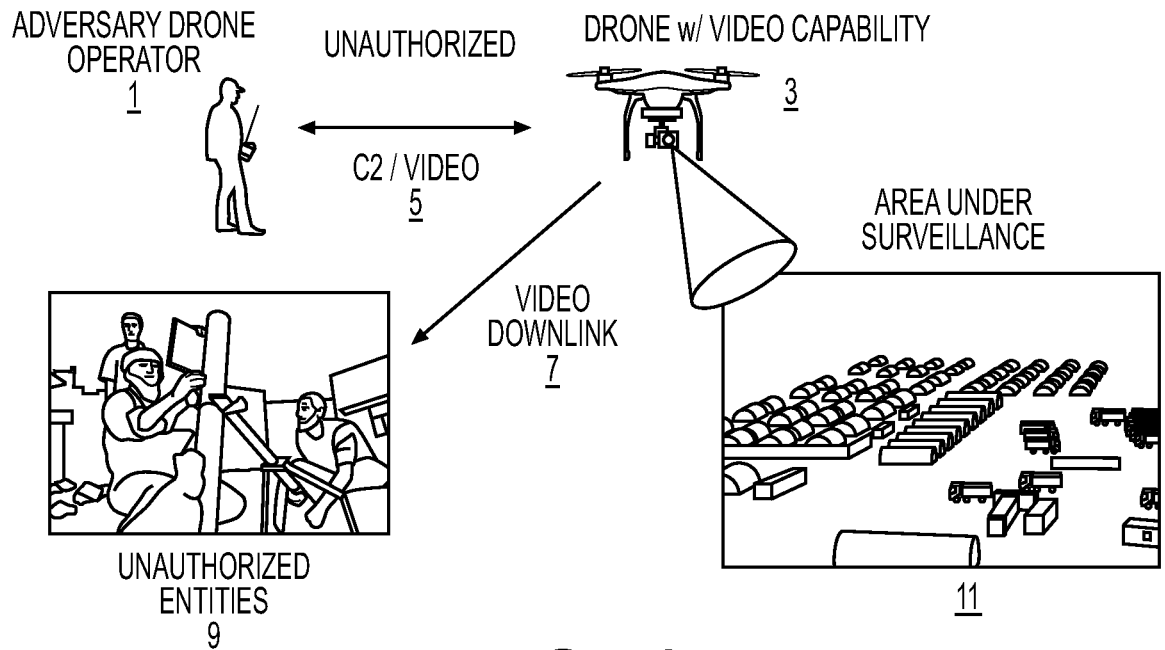
FIG. 1 shows a drawing showing a problem context for various embodiments of the invention.
Figure 2:
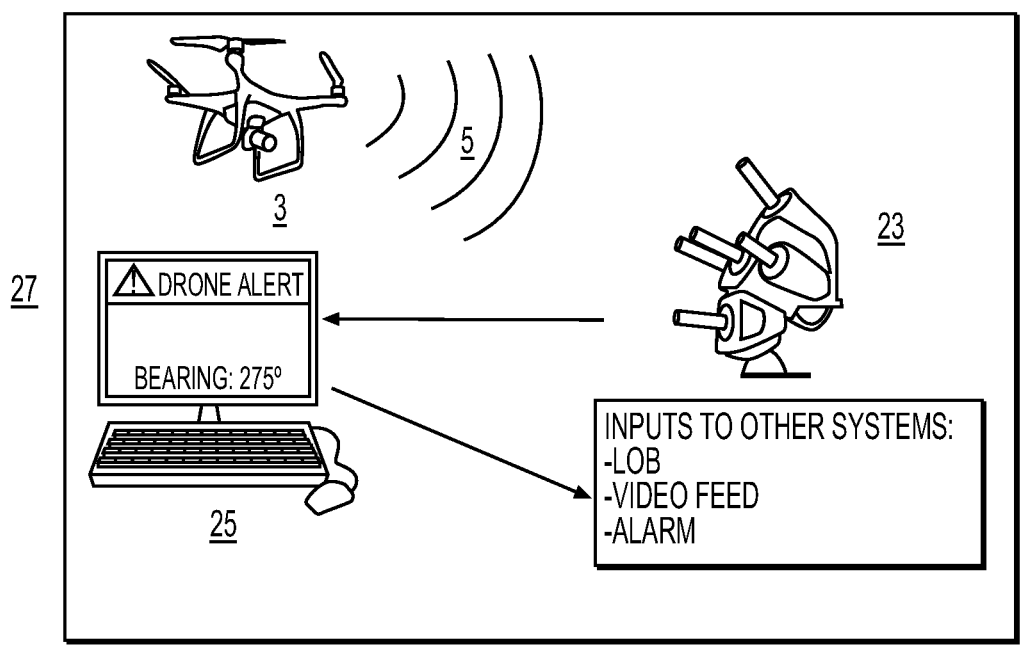
FIG. 2 shows a simplified system in relation to an unauthorized drone along with outputs that form inputs to other systems including line of bearing (LOB), video feed, and an alarm signal.

FIG. 2 shows a simplified system in relation to an unauthorized drone along with outputs that form inputs to other systems including line of bearing (LOB), video feed, and an alarm signal.

Figures 3, 4:
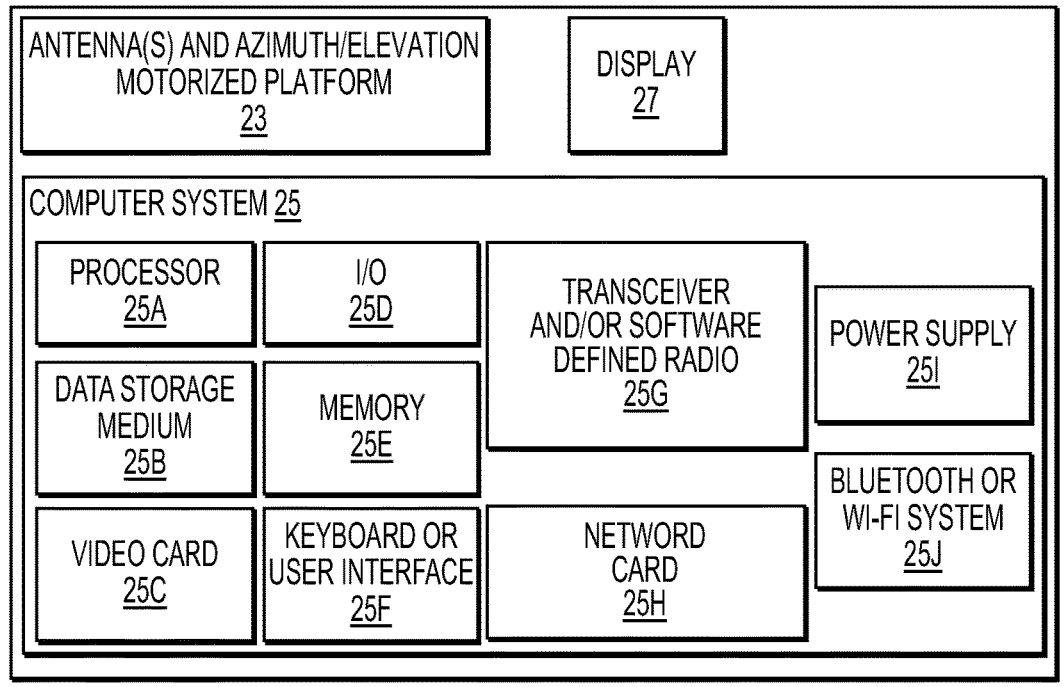
FIG. 3 shows a simplified system architecture of a control or computer system with transceiver and/or software defined radio (SDR), a directional antenna system, and a display.
FIG. 4 shows a list of exemplary frequencies which one or more embodiments of the invention detect.

FIG. 3 shows a simplified system architecture of a control or computer system 25 with transceiver and/or software defined radio (SDR) 25G, directional antenna system 23, and a display 27 showing one or more GUIs. An exemplary system can be powered from a 12 volt power supply 251 connected via 15-pin D-Sub connector (not shown). Voltage can be supplied to a regulator circuit that steps the voltage down to 5 v, which supplies power for system components (e.g., control boards, video modules, serial communication, Bluetooth, motorized platform). A processor 25A executes machine readable instructions, e.g. see FIG. 8, that execute various functions, control various components, and generate various outputs that are stored, e.g., on data storage medium 25B and selectively interact with memory 25E. The exemplary machine readable instructions operate various components including a video card 25C, input/output (I/O) system 25D, keyboard or user interface 25F, display 27, network card 25H, transceiver and/or SDF 25G, and Bluetooth® or Wi-Fi system 251. Additional embodiments can use a mobile device (not shown), connected externally, to send and receive data from an I/O board 25D through a Bluetooth connection. The exemplary I/O board receives the RSSI measurements from the antenna 23, sends control signals to the antenna's motorized platform 23, and outputs azimuth/elevation data to other systems via, e.g., a USB connection.

FIG. 4 shows a list of exemplary frequencies which one or more embodiments of the invention detect. In this example, exemplary detectable uplink, telemetry, and payload (e.g., video signals) can include: ~900 MHz (e.g., 902-928), ~1.2 GHz (e.g., 1.24 to 1.36), ~2.4 GHz (e.g., 2.3 to 2.5), and ~5.8 GHz (e.g., 5.68 to 5.94). Detectable signals associated with a drone of interest may or may not use spread spectrum for transmit or receive channel selections.

Figure 5:
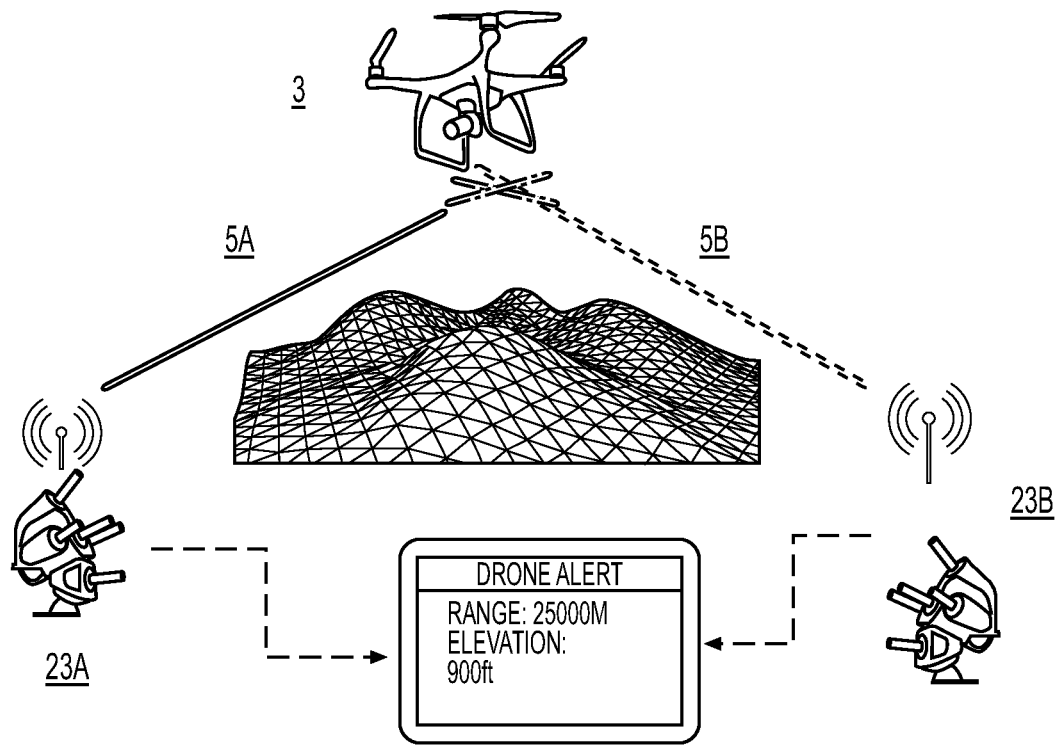
FIG. 5 shows a perspective view of an exemplary simplified system with multiple directional antennas detecting an unauthorized drone and feeding data to a control or computer system with an exemplary graphical user interface showing an alert with exemplary alert data.

FIG. 5 shows a perspective view of an exemplary simplified system with multiple directional antennas 23A, 23B detecting an unauthorized drone 3 and feeding data to a control or computer system 25 and display 27. Display 27 shows simplified exemplary graphical user interface showing an alert with exemplary alert data. This embodiment enables an increased capability to detect unauthorized drones with multiple detections. However, exemplary systems can use only one antenna assembly 23 which have multiple mounted directional antennas that perform directional finding and RSSI detection. Helix antennas can be used in one embodiment.

Figure 6:
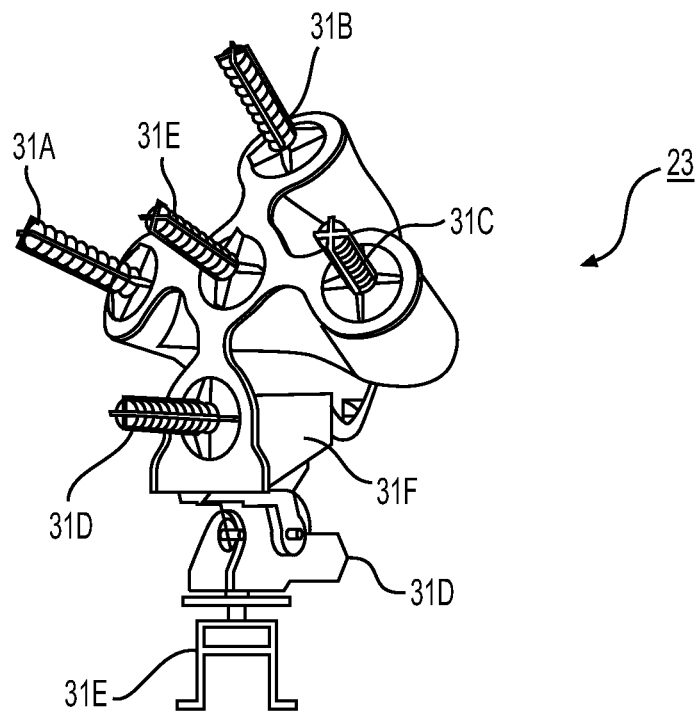
FIG. 6 shows an exemplary directional antenna assembly with multiple directional antennas on a motorized moveable base.

FIG. 6 shows an exemplary directional antenna assembly 23 with multiple directional antennas 31A-31E on a motorized moveable base 31D, 31E. In particular, an exemplary embodiment of the invention can include an array of five directional antennas 31A, 31B, 31C, 31D, 31E, such as a helix antenna, (top 31B, bottom 31C, left 31A, right 31C, and center 31E) mounted on an antenna mount 31F that are connected to a video signal receiver or processor (e.g., 25C; alternative embodiments can use, e.g., five video receivers (not shown) mounted directly on the antenna or connected externally). Four exemplary outside antennas (top, bottom, left, and right) can be used for detection and tracking, while the center antenna 31E can be used to intercept transmitted drone video feed or stream 7. Each individual receiver module has the ability to continuously measure the received signal strength (RSSI) of the antenna it is connected to. An exemplary system can move the antenna assembly via sweeping or other motion to fix or orient the center antenna 31E onto the transmitting video signal 7 by equalizing detected RSSI or video signal values among the four outside antennas. With use of an exemplary motorized platform 31D, 31E, a control system (e.g., 25) and user is able to reposition the antenna assembly 23 to ensure that a transmitted video signal 7 stays fixed or oriented with respect to the center antenna 31E.

Figure 7:
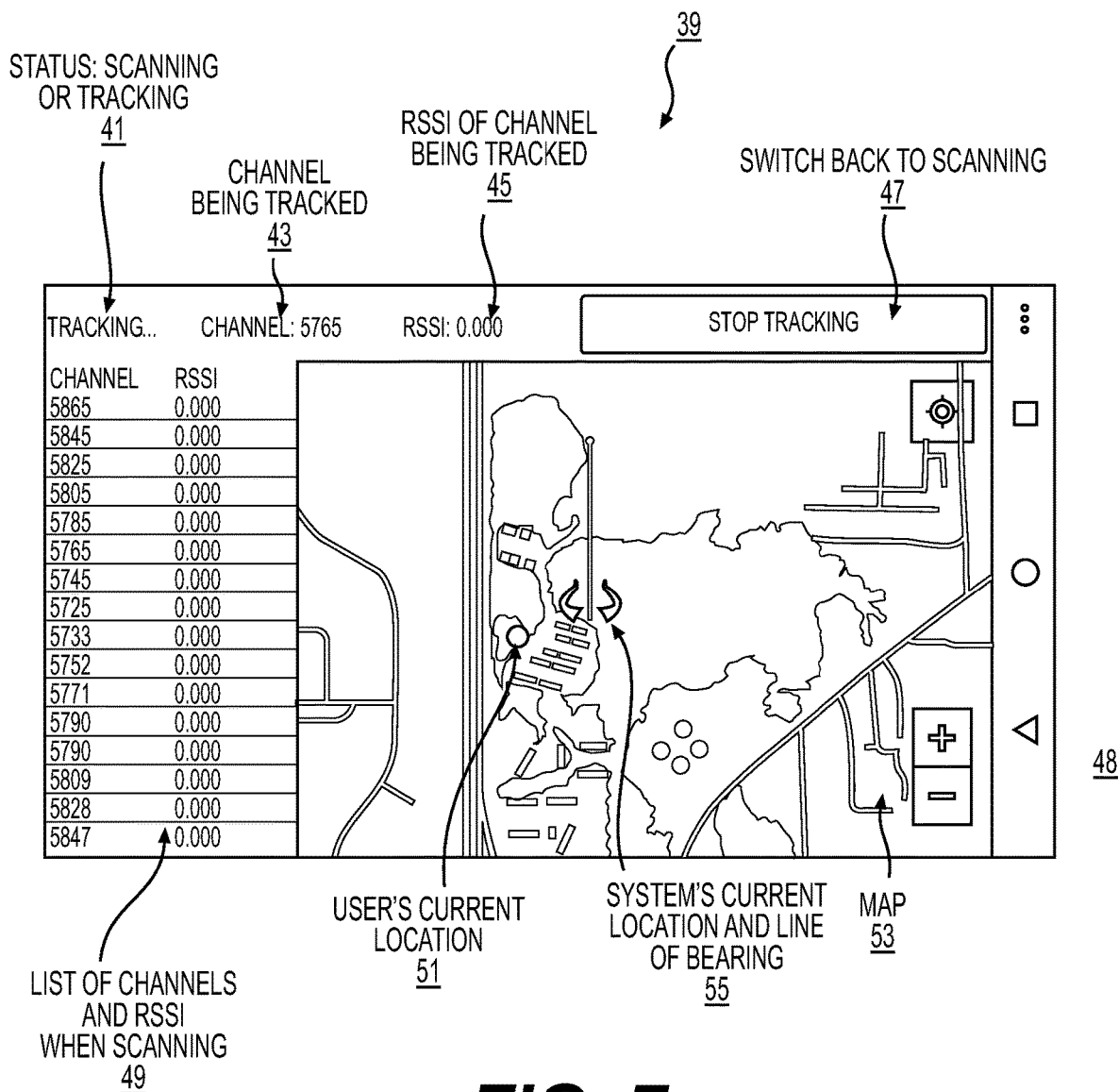
FIG. 7 shows an exemplary GUI with a map and other data associated with one embodiment of the invention.

FIG. 7 shows an exemplary GUI 39 with a map 53 and other data associated with one embodiment of the invention. A map 53 is shown with various topological attributes such as a highway, buildings vegetation etc that enable a user to orient on visual cues associated with an area of interest. A status section 41 shows system activity, e.g., scanning, tracking, etc. A channel being tracked 43 is shown. RSSI of channel being tracked 45 is shown. Graphical control icons are shown, e.g., switch back to scanning/stop tracing 47 is shown at a periphery of the exemplary GUI 39. A list of channels and RSSI when scanning 49 is also shown. A user's current location 51 is also shown in relation to the map 53. An antenna assembly with current line of bearing (LOB) 55 is also shown. Map controls 48 (e.g., zoom in, zoom out) are shown on a periphery of the exemplary GUI 39. Additional GUIs (not shown) can also provide additional functionality or controls which enable sending data to or control of external systems (not shown).

FIG. 8 shows an exemplary list of software functions that are executed to perform various functions associated with at least one embodiment of the invention. Exemplar function public void loop( ) 71 controls various system elements to perform a continuous loop that handles all processing and events. Exemplary function Loop 71 is controlled by a boolean flag indicating if the system is scanning (e.g., 360 degree coverage measuring RSSI for all channels) or tracking (determining LOB for channel of interest). Exemplary function public void setChannelModule(int channel) 73 sets a current channel on the receivers to the specified channel. Exemplary function public void readRSSI( ) 75 reads and averages RSSI from all receivers. Exemplary function public boolean passThreshold_Pan_Left( ) 77 determines if the antenna assembly system 23 should pan to the left. Exemplary function public boolean passThreshold_Pan_Right( ) 79 determines if the system should pan to the right. Exemplary function public boolean passThreshold_Tilt_Up( ) 81 determines if the exemplary antenna assembly system 23 should tilt up. Exemplary function public boolean passThreshold_Tilt_Down( ) 83 determine if the exemplary antenna assembly system 23 should tilt down. Exemplary function double PWMtoAZ( ) 85 determine a current azimuth of the exemplary antenna assembly system 23. Exemplary function double PWMtoEL( ) 87 determine a current elevation of the exemplary antenna assembly system 23. Exemplary function private void updateTextTrack( ) 89 updates a user interface, e.g., GUI 39 with new RSSI value of channel that is being tracked 45. Exemplary function private void updateListView( ) 91 updates the list of channels on the user interface (e.g., 41) with new RSSI values (e.g. 49) sorted in descending order. Exemplary function public void updateMapMarkerRotation(float angle) 93 updates the map 53 on the user interface, e.g., GUI 39, with the new LOB of the system 55.

FIG. 9 shows an exemplary application system with scan and track functions associated with at least one embodiment of the invention. Exemplary Application Cycle: SCAN. Step 101: SCAN: all channels using center antenna 31E. Step 103: CALCULATE: relative received signal strength (RSSI) of each channel. Step 105: UPDATE POSITION: rotate antenna assembly 23 forty five degrees. Step 107: UPDATE GUI 39: display RSSI of all channels in descending order and update line of bearing; (back to step 101) OR user selects channel to track (proceed to step 109). Application Cycle: TRACK. Step 109: SCAN: selected channel with four outer antennas 31A, 31B, 31C, 31D. Step 111: CALCULATE: RSSI of the selected channel from each antenna 31A-31D and determine which outer antenna had the strongest RSSI. Step 113: UPDATE POSITION: azimuth (pan) or elevation (tilt) in direction of antenna with strongest RSSI. Step 115: UPDATE GUI 39: update RSSI and line of bearing 55. (back to step 107) OR user selects scan button (back to step 101)

Figure 10:
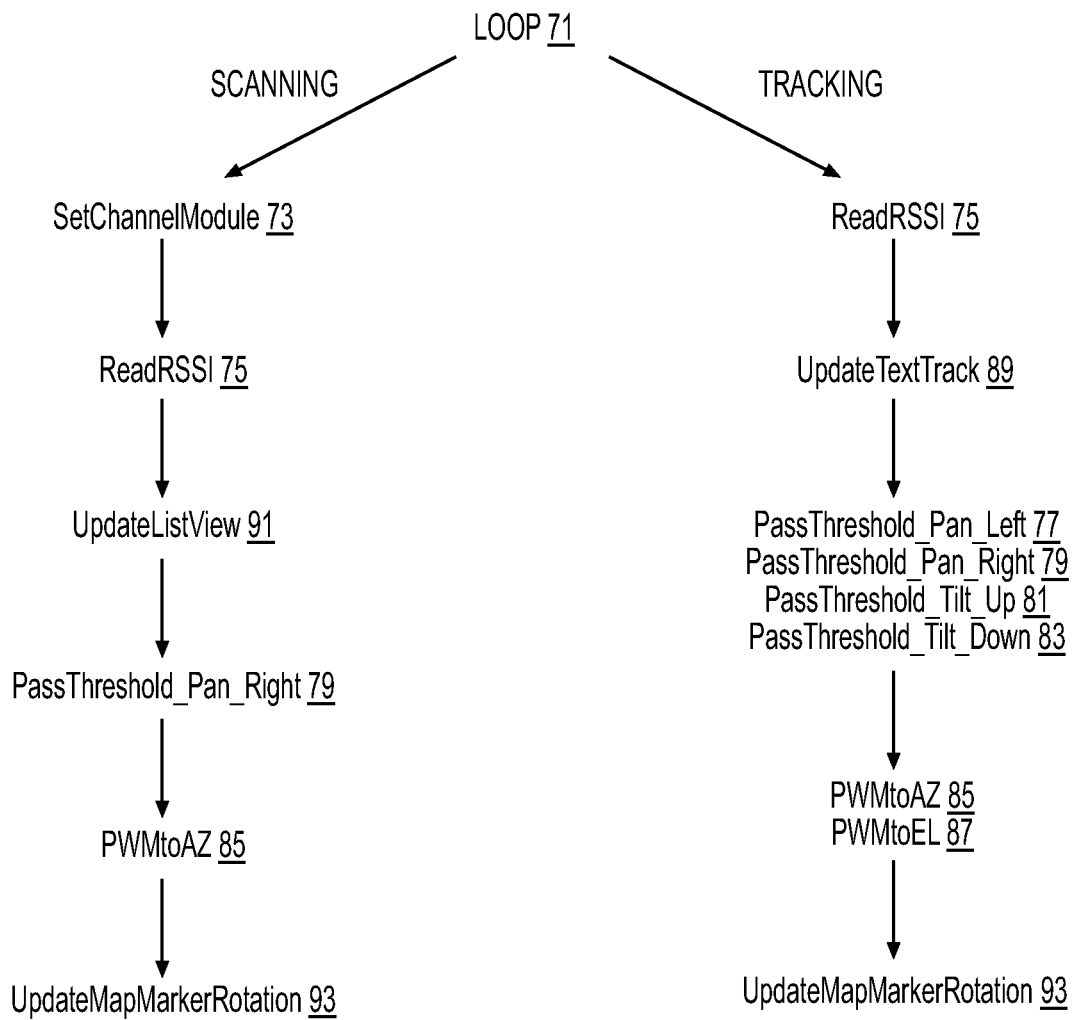
FIG. 10 shows an exemplary sequence of function call executions in accordance with one embodiment of the invention.

FIG. 10 shows an exemplary sequence of function call executions in accordance with one embodiment of the invention. Loop 7 executes which operates various application cycles, e.g., scanning or tracking. The scanning function call sequences include SetChannelModule 73, readRSSI 75, updateListView 91, passThreshold_Pan_Right 79, PWMtoAZ 85, and updateMapMarkerRotation 93. The exemplary tracking function sequence includes readRSSI 75, updateTextTrack 89, passThreshold_Pan_Left 77/passThreshold_Pan_Right 79/passThreshold_Tilt_Up 81/passThreshold_Tilt_Down 87, and updateMapMarkerRotation 93.

Various embodiments have various modes and functions such as Scan Mode, Acquire Mode and Track Mode as well as some additional control modes such as, for example, remote control of other systems. For example, the exemplary scan function can focus on four search quadrants. An exemplary system starts when the user selects the "Scan" button on an exemplary GUI 39 which initiates scan mode. System elements rotates the exemplary antenna array 23 to the first quadrant. Once there, it will scan through the frequencies of interest and individually record the RSSI for each frequency from the four outer antennas 31A, 31B, 31C and 31D. Exemplary system can then take an average of the four readings for each scanned frequency and update their RSSI values on the GUI 39. After the complete frequency scan is completed, system elements can order frequency/RSSI pairs in descending order biased on RSSI value within a table in the GUI 39. At any time, a user has an ability to stop scan operations by selecting a frequency within this table to acquire and track. If there is no user interaction, the exemplary system will continue rotating and scanning the next three quadrants. Once it reaches the final quadrant, the exemplary system will reset the antenna array 23 to the first quadrant and repeat the scan process.

If the user selects a frequency from the table located in the GUI 39, the exemplary system will go into an acquire mode. The system will scan through all four quadrants measuring the RSSI for only the selected frequency using the four outer antennas. After the end of this acquire scan, the exemplary system can slew the antenna array 23 to the point where a maximum averaged RSSI value was measured. At this time, the exemplary system can switch into tracking mode where it can track a transmitting device both in azimuth and elevation.

In an exemplary tracking mode, the four outer antennas 31A, 31B, 31C, and 31D work together to fix a fifth antenna 31E, located in the center, on a detected transmitting device. It can achieve this by comparing the RSSI values of two adjacent antennas and moving the system in azimuth and elevation to make a RSSI value equal making the center antenna fixed to the transmitter. Comparing left and right antennas, the exemplary system is able to track the detected transmitter in azimuth. Likewise, comparing the top and bottom antennas the system is able to track the detected transmitter in elevation. The user is provided an ability to stop the track operation at any time and return to scan mode.

The GUI 39 can display a table of frequencies/RSSI values, scan button and map. The bearing of the antenna array system 23 is displayed by overlaying an indicator line 55 on a map 53. If the detected transmitter is a video signal, the user will be able to view the live video feed and record it from within another GUI (not shown).

By interfacing two DIAT's 23A, 23B, a user will be able to precisely get both bearing and distance of the transmitting source.

Exemplary systems are able to detect and track any specified frequencies. For counter UAS missions, an exemplary system can detect and track frequencies including command and control (C2), telemetry, and video. The signals can be encrypted or unencrypted.

Various embodiments have an ability to not only receive signals but also transmit signals. For C-UAS missions the system can transmit signals to jam the C2, telemetry, video, and/or GPS of the UAS. The system can also send legitimate but spoofed signals to deceive these systems.

An exemplary GUI (e.g., 39) can be displayed on a variety of systems including an Android application that can integrate into various applications or systems including the U.S. military's Android Tactical Assault Kit (ATAK). A user can connect to various embodiments either through a wired connection or wireless connection (i.e. Bluetooth, or Wi-Fi). Embodiments can also connect and feed its data to a common operating picture (COP) that integrates several other systems. Various embodiments can send data to a remote COP using a variety of messaging protocols including Cursor-On-Target (COT).

Various embodiments can also include systems which are able to distinguish between RCMA UAS systems which use the same or similar systems that are detectable such as communication systems using the same or similar frequencies and data signals. For example, exemplary systems can use Doppler changes in received signals indicating that a source is moving which can disqualify stationary signal emission systems. Another embodiment can use flight, position (azimuth/elevation, altitude, etc), or movement profiles to screen out systems such as fixed location Wi-Fi systems that happen to use the same signal frequency that a RCMA UAS is using. Another embodiment can also detect contents of a transmitted signal to determine if the signal is or is not a video signal and therefore screen out non-sensor or video signals to further reduce false detections.

Although the invention has been described in detail with reference to certain preferred embodiments, variations and modifications exist within the spirit and scope of the invention as described and defined in the following claims.

The invention claimed is:

1. A drone detection, tracking, and controls system comprising:
an antenna assembly comprising a plurality of directional antennas and a movement system adapted to move the directional antennas in various azimuth and elevation orientations;
a control system comprising a processor, a video signal processor, a transceiver, an input/output system, a user interface, a wireless system, a machine instruction storage medium, and a plurality of machine readable instructions that operate the antenna assembly to detect, orient on, and record at least a video signal from a moveable platform as well as generate a graphical user interface (GUI) that shows a map with a user location, the antenna system location, and orientation of the antenna assembly with line of bearing, the graphical user interface also displaying a plurality of radio channel and received signal strength information (RSSI); and
a display system that displays the GUI;
wherein the control system is configured to depict the user location, the antenna system location, and orientation of the antenna assembly with line of bearing on the map.

2. A detection, tracking, and controls system comprising:
an antenna assembly comprising a left, top, right, bottom, and center directional antenna and a movement system adapted to move the antenna assembly and each directional antenna in various azimuth and elevation orientations, wherein the left, top, right, bottom directional antennas are equidistantly spaced around the center directional antenna;
a control system configured to operate in a scanning state and a tracking state comprising a processor, a video signal processor, a transceiver, an input/output system, a user interface, a wireless system, a machine instruction storage medium, and a plurality of machine readable instructions that operate the antenna assembly to detect, orient on, and record at least a video signal from a moveable platform as well as generate a graphical user interface (GUI) that shows a map with a user location, the antenna system location, and orientation of the antenna assembly with line of bearing, the graphical user interface also displaying a plurality of radio channels and received signal strength information (RSSI); and
a display system that displays the GUI;
wherein the scanning state of the control system is configured to scan the plurality of radio channels with the center directional antenna, calculate the RSSI of each radio channel of the plurality of radio channels received by the center directional antenna, and rotate the antenna assembly a predetermined number of degrees;
wherein the tracking state of the control system is configured to scan a selected radio channel of the plurality of radio channels with the left, top, right, bottom, and center directional antennas, calculate RSSI of the selected radio channel received by the left, top, right, bottom, and center directional radio antennas, and pan or tilt the antenna assembly in the direction of whichever directional antenna detects a strongest RSSI.

3. The system of claim 2, wherein the GUI depicts the user location, the antenna system location, and orientation of the antenna assembly with line of bearing on the map.

4. The system of claim 2, wherein the control system is configured to toggle between the scanning state and the tracking state when an RSSI threshold is met.

5. The system of claim 4, wherein the control system is further configured to toggle between the scanning state and the tracking state in respond to a user input.

* * * * *